3,335,148
9(3-PYRIDYL)DERIVATIVE OF FLUORENE, 9-FLU-
ORENOL, XANTHENE, 9-XANTHENOL AND THE
CORRESPONDING NONPHYTOTOXIC ACID AD-
DITION SALTS THEREOF
Eriks Krumkalns, Indianapolis, Ind., assignor to Eli Lilly
and Company, Indianapolis, Ind., a corporation of
Indiana
No Drawing. Filed Feb. 17, 1966, Ser. No. 528,101
3 Claims. (Cl. 260—297)

This invention relates to novel 3-substituted pyridines and the nonphytotoxic acid addition salts thereof. More particularly, this invention relates to compounds of the formula:

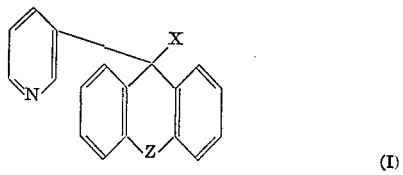

(I)

wherein

X is hydrogen or hydroxyl;
Z is $-(CH_2)_n-$, $-CH=CH-$, oxygen, or sulfur;
$n$ is 0, 1, or 2; and the nonphytotoxic acid addition salts thereof.

Suitable nonphytotoxic acid addition salts of the bases represented by the above formula can be prepared employing, for example, the following acids: hydrochloric, hydrobromic, sulfuric, phosphoric, nitric, oxalic, methanesulfonic, p-toluenesulfonic, maleic, and the like.

The novel compounds of this invention have useful antifungal and antibacterial properties and have been found useful in controlling fungi which attack food crops, ornamental plants, and turf.

The novel 3-substituted pyridinols (X=OH in Formula I) are readily prepared by the following synthesis, which makes them available in good yields. The synthesis is carried out by allowing 3-pyridyllithium (prepared from 3-bromopyridine and n-butyllithium) to react with a ketone, for example, 9-fluorenone, in a suitable solvent such as ether under an atmosphere of dry nitrogen, at a temperature of —40° to —70° C. for about two hours. The cooling bath is removed and the mixture allowed to warm to ambient room temperature overnight. The reaction product mixture is commingled with diluted aqueous acid solution, for example, dilute aqueous hydrochloric acid; and the layers are separated. The aqueous layer is made basic with a strong base such as sodium hydroxide and extracted with ether. The ether extract is dried and concentrated in vacuo to leave a residue, which is recrystallized from a mixture of hot benzene and petroleum ether to yield 9-(3-pyridyl)-9-fluorenol.

When X=H in Formula I, the novel compounds are prepared by the procedure taught by Sperber et al., U.S. Patent 2,727,895 (Dec. 20, 1955), whereby the 3-substituted pyridinol as prepared above is heated in a mixture of glacial acetic acid, concentrated hydrochloric acid, and 47 percent aqueous hydriodic acid to reduce the hydroxyl group.

While the compounds of the present invention have been defined in terms of a structural formula which depicts the novel structural features of the claimed compounds and which indicates the presence therein of certain well-known organic radicals, including pyridyl, fluorenyl, xanthenyl, thioxanthenyl, dibenzocycloheptenyl, and dibenzocycloheptyl, it will be recognized by those skilled in the art that such radicals may bear one or more substituents without departing in any way from the spirit of the invention and without altering the properties of the novel compounds in such a way as would set them apart from the invention or take them outside its scope. Compounds having the novel structure of the present invention and bearing such susbtituents are accordingly to be considered as equivalents of the unsubstituted compounds and are to be considered to lie within the scope of the invention. Among such substituent atoms and radicals are chloro, bromo, fluoro, iodo, trifluoromethyl, hydroxy, methyl, ethyl, n-propyl, isopropyl, methoxy, methylmercapto, and the like.

The following examples describe in detail the methods used in preparing the novel compounds of this invention. However, the invention is not to be construed as limited thereby either in spirit or in scope since it will be apparent to those skilled in the art that many modifications both of materials and methods may be practiced in the purpose and intent of this disclosure.

*Example 1.—9-(3-pyridyl)-9-fluorenol*

Using a 1-liter round-bottomed, 3-necked reaction flask equipped with mechanical stirrer, dropping funnel, and low temperature thermometer, 3-pyridyllithium was prepared in a dry nitrogen atmosphere from 16 g. (0.1 mole) of 3-bromopyridine and 54 g. (0.13 mole) of a 15 percent solution of n-butyllithium in hexane, using 200 ml. of dry ether as solvent, while maintaining the reaction temperature below —50° C. with an acetone Dry-Ice bath. To the cold solution was added a solution of 18 g. (0.1 mole) of 9-fluorenone dissolved in 150 ml. of dry ether, keeping the reaction temperature below —40° C. by continued cooling with the acetone Dry-Ice bath. After the addition was complete, the reaction mixture was held at —60° C. for another two hours, and then allowed to warm to ambient temperature overnight.

The reaction product mixture was extracted with about 200 ml. of aqueous 10 percent hydrochloric acid. The aqueous acid solution was basified with concentrated aqueous sodium hydroxide and extracted with large volumes of ether. The ether extracts were combined, dried, and concentrated in vacuo to dryness to leave a residue. The residue was dissolved in hot anhydrous benzene and petroleum ether added to the benzene solution so that a solid precipitated having a melting point of about 152° C. and weighing 19 grams. The solid was identified as 9-(3-pyridyl)-9-fluorenol.

Using a small sample of the free base, 9-(3-pyridyl)-9-fluorenol hydrochloride was prepared having a melting point of about 207° C.

Following the general procedure of Example 1, with appropriate starting materials, other compounds were prepared and isolated as free bases or acid addition salts thereof:

5-hydroxy-5-(3-pyridyl)-10,11-dihydro - 5H - dibenzo [a,d]-cycloheptane. Melting point: 152–153° C.
9-(3-pyridyl)-9-xanthenol. Melting point: 170° C.
9-(3-pyridyl)-9-thioxanthenol. Melting point: 204° C.
5-(3-pyridyl)-5H-dibenzo[a,d]cyclohepten-5-ol hydrochloride. Melting point: 221° C.

*Example 2—5-(3-pyridyl)-10,11-dihydro-5,4-dibenzo[a,d]cycloheptane*

A mixture of 0.1 mole of 5-hydroxy-5-(3-pyridyl)-10, 11-dihydro - 5H - dibenzo[a,d]cycloheptane, 19 ml. of glacial acetic acid, 5 ml. of concentrated hydrochloric acid, and 20 ml. of aqueous 47 percent hydriodic acid was heated for about 3 hours. The reaction product mixture was poured into a mixture of 100 ml. of water and 8 g. of sodium bisulfite. The mixture was made strongly basic with aqueous concentrated sodium hydroxide and extracted with several volumes of ether. The combined ether extracts were dried and concentrated in vacuo and the residue was recrystallized from benzene to yield 5-

(3 - pyridyl)-10,11-dihydro-5,4-dibenzo[a,d]cycloheptane having a melting point of about 115° C. The product weighed about 21.5 grams.

I claim:
1. A compound of the formula

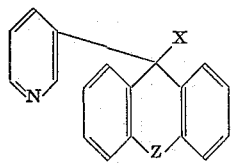

wherein
X is hydrogen or hydroxyl;
Z is —$(CH_2)_n$— or oxygen;
$n$ is 0 or 1; or the nonphytotoxic acid addition salts thereof.
2. A compound as in claim 1, said compound being 9-(3-pyridyl)-9-fluorenol hydrochloride.
3. A compound as in claim 1, said compound being 9-(3-pyridyl)-9-xanthenol.

References Cited

McCarty et al.: J. Am. Chem. Soc., vol. 79, pp. 472–80 (1957).
Villani et al.: Chem. Abstracts, vol. 61, par. 6987 (1964).
Winthrop et al.: J. Org. Chem., vol. 27, pp. 230–240.

WALTER A. MODANCE, *Primary Examiner.*
ALAN L. ROTMAN, *Assistant Examiner.*

Disclaimer and Dedication

3,335,148.—*Eriks Krumkalns*, Indianapolis, Ind. 9(3-PYRIDYL) DERIVATIVE OF FLUORENE, 9-FLUORENOL, XANTHENE, 9-XANTHENOL AND THE CORRESPONDING NONPHYTOTOXIC ACID ADDITION SALTS THEREOF. Patent dated Aug. 8, 1967. Disclaimer and dedication filed May 18, 1972, by the assignee, *Eli Lilly and Company*.

Hereby disclaims claims 1, 2 and 3, all the claims of said patent, and dedicates to the Public the remaining term of said patent.

[*Official Gazette August 29, 1972.*]